(12) United States Patent
Krishnan et al.

(10) Patent No.: US 9,054,945 B1
(45) Date of Patent: Jun. 9, 2015

(54) CONFIGURING STORAGE ACCESS CONTROL

(71) Applicants: Sriram Krishnan, Shrewsbury, MA (US); Bruce R. Rabe, Dedham, MA (US); Yidong Wang, Upton, MA (US)

(72) Inventors: Sriram Krishnan, Shrewsbury, MA (US); Bruce R. Rabe, Dedham, MA (US); Yidong Wang, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 251 days.

(21) Appl. No.: 13/712,193

(22) Filed: Dec. 12, 2012

(51) Int. Cl.
*G06F 15/173* (2006.01)
*H04L 12/24* (2006.01)
*H04L 29/08* (2006.01)

(52) U.S. Cl.
CPC ............ *H04L 41/00* (2013.01); *H04L 67/1097* (2013.01)

(58) Field of Classification Search
USPC ........................................................ 709/225
See application file for complete search history.

(56) References Cited

U.S. PATENT DOCUMENTS

| 6,061,753 | A  | * | 5/2000  | Ericson ........................ 710/107 |
| 6,754,718 | B1 |   | 6/2004  | Dobberpuhl et al. |
| 7,506,040 | B1 | * | 3/2009  | Rabe et al. ..................... 709/223 |
| 7,856,022 | B1 | * | 12/2010 | Wigmore ................. 370/395.71 |
| 8,028,110 | B1 | * | 9/2011  | Wigmore ........................ 710/74 |
| 8,060,630 | B1 | * | 11/2011 | Jancaitis et al. .............. 709/229 |
| 8,185,639 | B2 | * | 5/2012  | Krishnan et al. ............. 709/228 |
| 8,825,919 | B1 | * | 9/2014  | Lim et al. ........................ 710/15 |
| 8,832,498 | B1 | * | 9/2014  | Jain et al. ........................ 714/26 |
| 8,856,257 | B1 | * | 10/2014 | Zhang et al. .................. 709/207 |
| 2002/0176433 | A1 | * | 11/2002 | Zhu et al. ...................... 370/422 |
| 2002/0176434 | A1 | * | 11/2002 | Yu et al. ......................... 370/422 |
| 2005/0169258 | A1 | * | 8/2005  | Millet et al. .................. 370/389 |
| 2006/0023751 | A1 | * | 2/2006  | Wilson et al. ................. 370/474 |
| 2011/0216778 | A1 | * | 9/2011  | Chung et al. .................. 370/401 |

* cited by examiner

*Primary Examiner* — Tauqir Hussain
(74) *Attorney, Agent, or Firm* — Muirhead and Saturnelli, LLC

(57) ABSTRACT

Described are techniques for configuring storage access control. A set of inputs including a first identifier of an initiator port and a device set devices in a data storage system is received. Responsive to receiving the set of inputs, an allowable path set is automatically defined for the initiator in accordance with an initiator-level of granularity. Each device in the device set is accessible by the initiator over each path in the allowable path set. The allowable path set includes paths between the initiator port and each target port of the data storage system. A set of target ports is either specified using a wildcard indicator denoting all target ports of the data storage system, or the set of target ports is otherwise determined implicitly as all target ports of the data storage system.

20 Claims, 11 Drawing Sheets

CONFIGURING STORAGE ACCESS CONTROL

BACKGROUND

1. Technical Field

This application generally relates to data storage systems, and more particularly to techniques used in connection with data storage system configuration.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

SUMMARY OF THE INVENTION

In accordance with one aspect of the invention is a method for configuring storage access control comprising receiving a set of inputs including a first identifier of an initiator port and a device set of one or more devices in a data storage system; and responsive to said receiving, automatically defining an allowable path set for the initiator in accordance with an initiator-level of granularity, wherein each device in the device set is accessible by the initiator over each path in the allowable path set, wherein the allowable path set includes paths between the initiator port and each target port of the data storage system and wherein a set of one or more target ports used to define the allowable path set is either specified by including in the set of inputs a wildcard indicator denoting all target ports of the data storage system thereby indicating that the allowable path set is defined with respect to paths between the initiator and all target ports of the data storage system, or the set of one or more target ports is otherwise determined implicitly as all target ports of the data storage system whereby the set of inputs does not include any input denoting the set of target ports. The allowable path set may be defined by providing the first identifier of the initiator port and the device set in said set of inputs using storage access control software and without explicitly identifying any target port as an input in the set of inputs, and automatically defining an allowable path set for the initiator may be performed by executing code of the access control software. The allowable path set may be defined by implicitly using all target ports currently in the data storage system. The allowable path set may be automatically updated in accordance with any changes to existing target ports of the data storage system. The data storage system may not include a first target port at a first point in time and the data storage system may include the first target port at a second point in time subsequent to the first point in time, and wherein the allowable path set at the first point in time may not include a first path from the initiator to the first target port, and wherein, responsive to adding the first target port to the data storage system at the second point in time, the allowable path set may be automatically updated to include a new path that is the first path from the initiator to the first target port thereby automatically allowing the initiator access to each device in the device set over the first path. The data storage system may include a first target port at a first point in time and the data storage system may not include the first target port at a second point in time subsequent to the first point in time. The allowable path set at the first point in time may not include a first path from the initiator to the first target port, and wherein, responsive to removing the first target port from the data storage system at the second point in time, the allowable path set may be automatically updated to remove the first path from the initiator to the first target port. The allowable path set for the initiator may be defined by providing the set of inputs to storage access control software. The set of inputs may include the first identifier of the initiator port, the device set, and the wildcard indicator denoting all target ports of the data storage system thereby indicating that the allowable path set is defined with respect to paths between the initiator and all target ports of the data storage system.

In accordance with another aspect of the invention is a method for configuring storage access control comprising: receiving a set of inputs including a device set of one or more devices in a data storage system and a first identifier identifying an entity that is any of an initiator port, a host, a group of one or more hosts; and responsive to said receiving, automatically defining an allowable path set for the entity in accordance with an entity-level of granularity, wherein a set of one or more target ports used to define the allowable path set is either specified by including in the set of inputs a wildcard indicator denoting all target ports of the data storage system thereby indicating that the allowable path set is defined with respect to all target ports of the data storage system, or the set of one or more target ports is otherwise determined implicitly as all target ports of the data storage system whereby the set of inputs does not include any input denoting the set of target ports; and wherein if the first identifier identifies the initiator port, each device in the device set is accessible by the initiator port over each path in the allowable path set and the allowable path set includes paths between the initiator port and each target port of the data storage system; and wherein if the first identifier identifies the host, the allowable path set includes paths between each initiator port of the host and each target port of the data storage system whereby each device in the device set is accessible to the host over each path in the allowable path set; and wherein if the first identifier identifies the group of one or more hosts, the allowable path set includes paths between each initiator port of each host in the group and each target port of the data storage system whereby each device in the device set is accessible to each host in the group over each path in the allowable path set from an initiator port of said each host. The identifier may identify the host, and at a first point in time, a first initiator set of one or more initiator ports may identify all initiator ports of the host at the first point in time and a first target port set of one or more ports identifies all target ports of the data storage system at the first point in time. At a second point in time subsequent to the first point in time, a second initiator set of one or more initiator ports may identify all initiator ports of the host at the second point in time and a second target port set of one or more ports identifies all target ports of the data storage system at the second point in time, and wherein the allowable path set may be automatically updated at the second point time responsive to any differences between the first initiator set and the second initiator set and responsive to any differences between the first target port set and the second target port set. The second initiator set may include a first initiator port not included in the first initiator set and the allowable path set from the first point in time may be automatically updated at said second point in time to add a new path for each path between the first initiator port and each target port of the second target port set. The first initiator set may include a first initiator port not included in the second initiator set and the allowable path set from the first point in time may be automatically updated at the second point in time to remove any path including the first initiator port. The first identifier may identify the group of one or more hosts, and at a first point in time, a first initiator set of one or more initiator ports may identify all initiator ports of all the hosts in the group at the first point in time, and a first target port set of one or more ports may identify all target ports of the data storage system at the first point in time. At a second point in time subsequent to the first point in time, a second initiator set of one or more initiator ports may identify all initiator ports of all the hosts in the group at the second point in time, and a second target port set of one or more ports may identify all target ports of the data storage system at the second point in time. The allowable path set may be automatically updated at the second point time responsive to any differences between the first initiator set and the second initiator set, and responsive to any differences between the first target port set and the second target port set. The second initiator set may include a first initiator port not included in the first initiator set and the allowable path set from the first point in time may be automatically updated at the second point in time to add a new path for each path between the first initiator port and each target port of the second target port set. The first initiator port may be included in a first host and the first host may be included in group at the second point in time and the first host may not be included in the group at the first point in time. The first initiator set may include a first initiator port not included in the second initiator set and the allowable path set from the first point in time may be automatically updated at said second point in time to remove any path including the first initiator port. If the first identifier identifies the host, the allowable path set may be defined by implicitly using all initiator ports currently in the host, and wherein if the first identifier identifies the group of one or more hosts, the allowable path set may be defined by implicitly using all initiator ports currently in all hosts of the group.

In accordance with another aspect of the invention is a computer readable medium comprising code stored thereon for configuring storage access control, the computer readable medium comprising code for: receiving a set of inputs including a first identifier of an initiator port and a device set of one or more devices in a data storage system; and responsive to said receiving, automatically defining an allowable path set for the initiator in accordance with an initiator-level of granularity, wherein each device in the device set is accessible by the initiator over each path in the allowable path set, wherein the allowable path set includes paths between the initiator port and each target port of the data storage system and wherein a set of one or more target ports used to define the allowable path set is either specified by including in the set of inputs a wildcard indicator denoting all target ports of the data storage system thereby indicating that the allowable path set is defined with respect to paths between the initiator and all target ports of the data storage system, or the set of one or more target ports is otherwise determined implicitly as all target ports of the data storage system whereby the set of inputs does not include any input denoting the set of target ports. The allowable path set may be defined by providing the first identifier of the initiator port and the device set in the set of inputs using storage access control software and without explicitly identifying any target port as an input in the set of inputs, and automatically defining an allowable path set for the initiator may be performed by executing code of the access control software. The allowable path set may be defined by implicitly using all target ports currently in the data storage system. The allowable path set may be automatically updated in accordance with any changes to existing target ports of the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
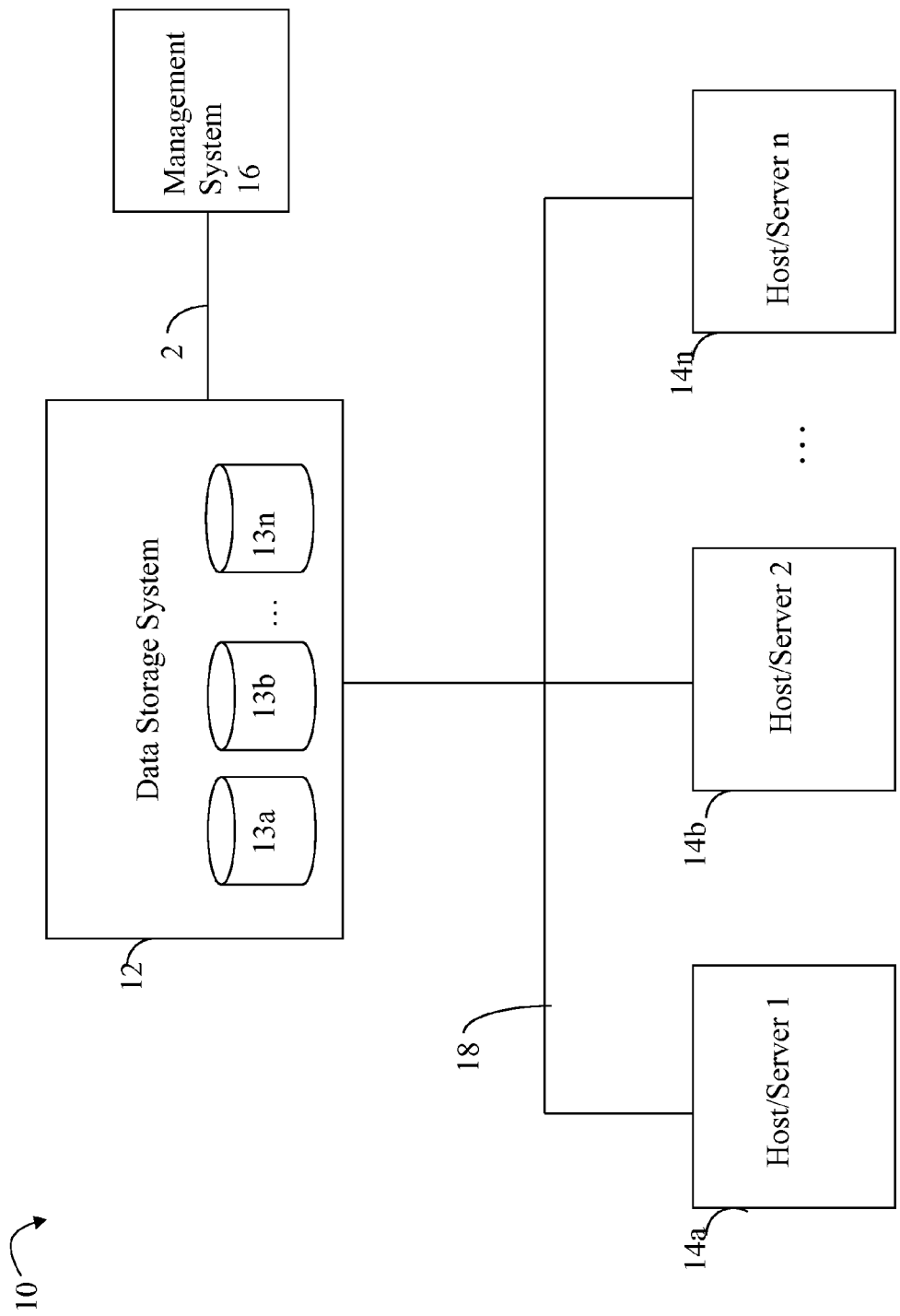
FIGS. 1, 3, 5, and 8 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14*a*-14*n* through communication medium 18. The system 10 also includes a management system 16 connected to one or more data storage systems 12 through communication medium 2. In this embodiment of the system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices or switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems, such as data storage arrays, offered by EMC® Corporation of Hopkinton, Mass. For example, an embodiment in accordance with techniques herein may include the VNXe™ storage system by EMC® Corporation. Each of the data storage systems may include one or more data storage devices 13a-13n, such as disks. One or more data storage systems may be manufactured by one or more different vendors. Each of the data storage systems included in 12 may be interconnected (not shown). As mentioned above, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
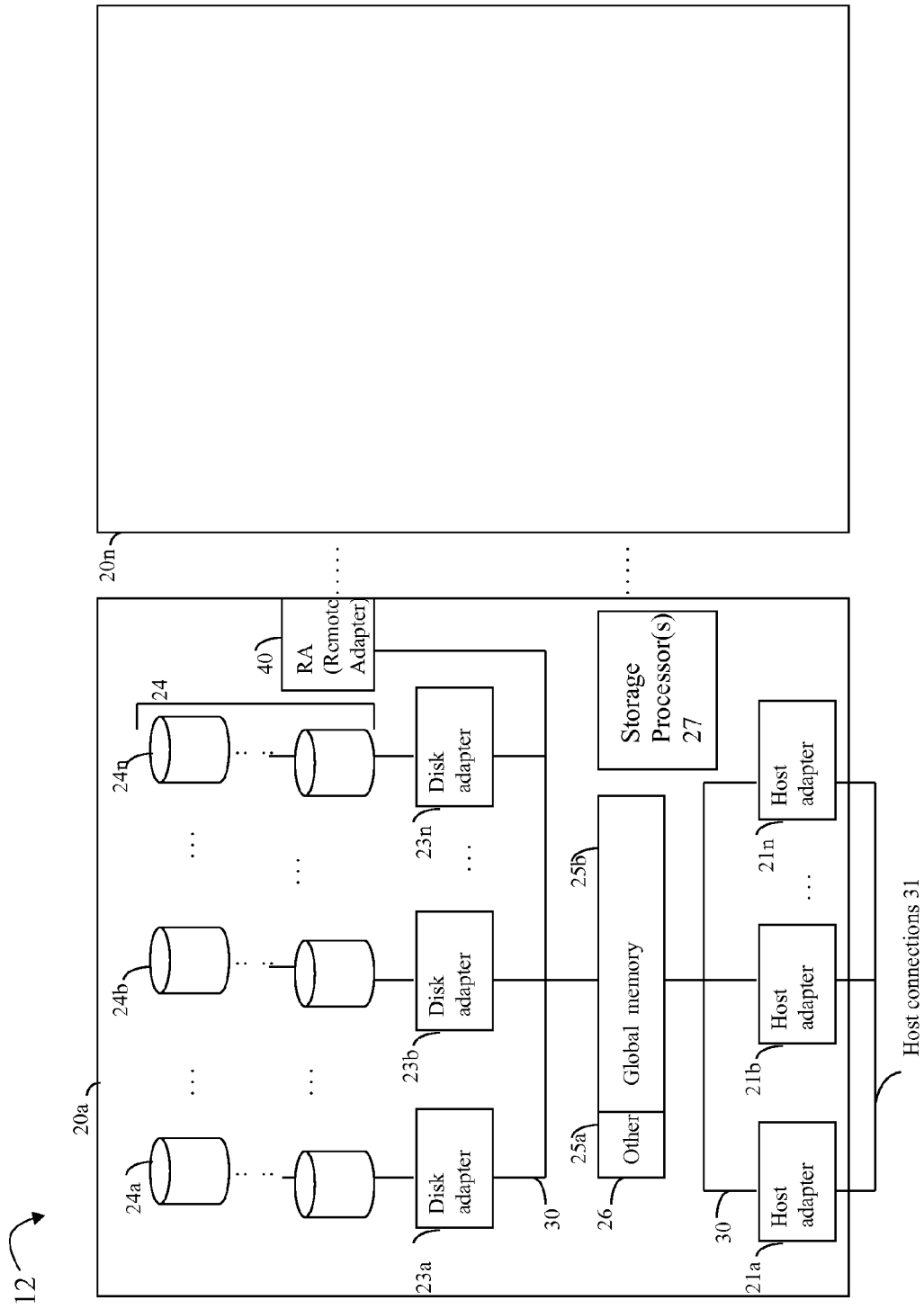
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array interconnected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. It should be noted that elements 24a-24n generally represent one or more different data storage devices analogous to elements 13a-13n of FIG. 1. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNXe™ data storage system by EMC Corporation includes two storage processors. The system 20a may also include one or more host adapters ("HAs") or directors 21a-21n. Each of the HAs may be used to manage communications and data operations between one or more host systems and the memory 26. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs (remote adapters), and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. In some embodiments of a data storage system, the memory 26 may be partitioned into two or more portions such as a global memory portion 25b and one or more other portions 25a. For example, in some embodiments of a data storage system including a single storage processor 27, the global memory portion 25b may be used to facilitate data transfers and other communications between the DAs, HAs and RAs in a data storage system. The DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, an embodiment of a data storage system, such as the VNXe™ data storage system by EMC Corporation, may include multiple storage processors each with their own memory used for communication between the different front end and back end components rather than utilize a global memory accessible to all storage processors. In such embodiments, memory 26 may include memory of each such storage processor.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 3:
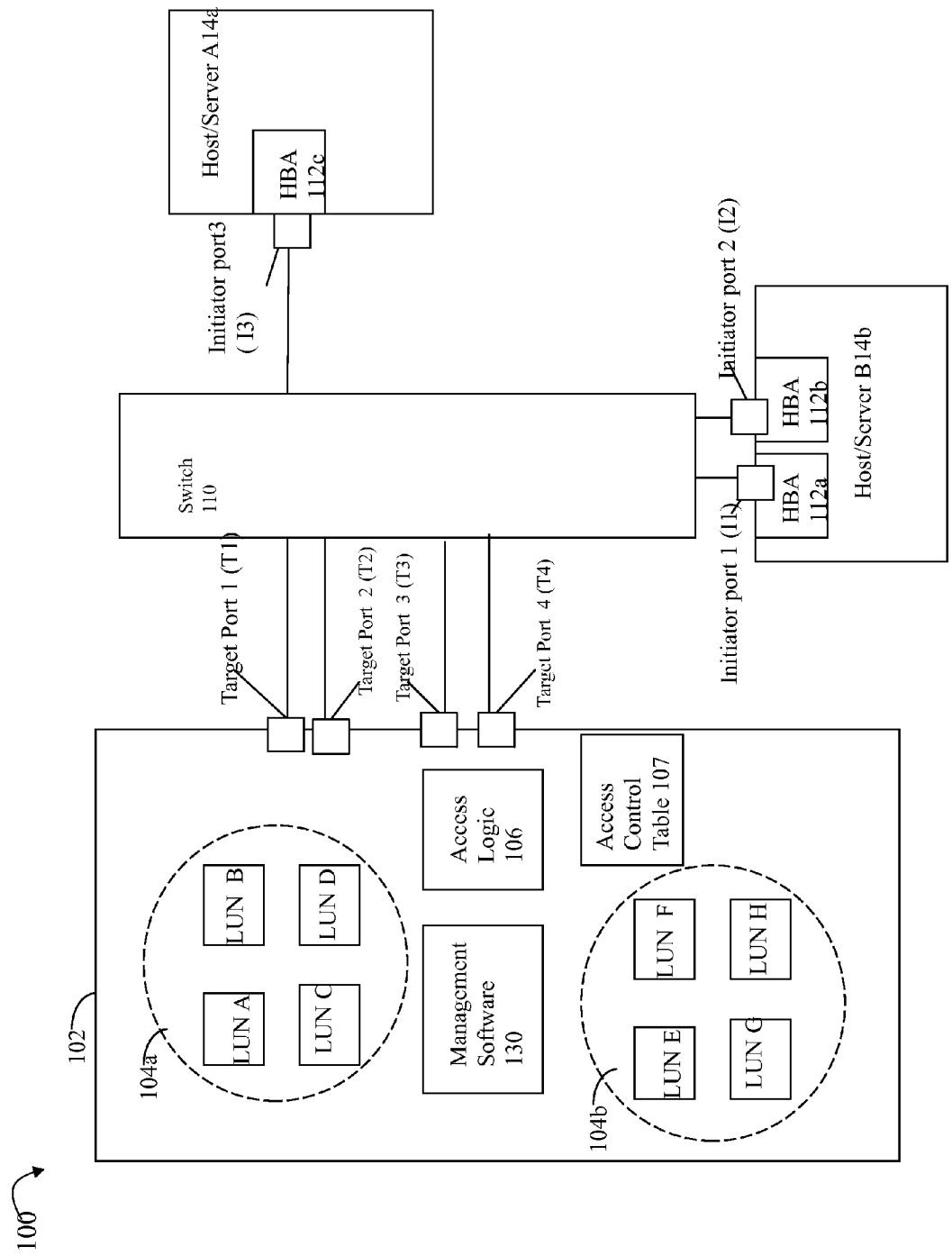

Referring to FIG. 3, shown is an example 100 of components that may be used in connection with techniques described herein. The example 100 may represent components included in a storage area network (SAN). Included in the example 100 is a data storage system 102, a switch 110, and hosts or servers 14a and 14b. The switch 110 may be used in connection with facilitating communications between each of the hosts 14a and 14b and the data storage system 102. Host 14a includes HBA or host bus adapter 112c with initiator port 3 (I3). Host 14b includes HBAs 112a, 112b. HBA 112a includes initiator port 1 (I1). HBA 112b includes initiator port 2 (I2). The data storage system 102 includes 4 target ports denoted as T1, T2, T3 and T4. Each target port of the system 102 may be characterized as a front end port of the data storage system that receives requests from the hosts 14a, 14b. Each of the target ports T1-T4 may be a port of an FA. An FA may generally include one or more target ports. In this example, the HBAs are illustrated as including a single port but may more generally include any suitable number of one or more ports.

Communications between a host and the data storage system 102 may be defined in terms of a path. A path may be defined in SCSI terms between an initiator port and a target port as two end points of the path. In this example, the switch 110 may be used to facilitate communications between each initiator port connected thereto and each target port connected thereto. In other words, paths may be defined through the switch 110 for each unique pair of initiator port and target port so that, in connection with the example 100, a total of 12 paths may exist (e.g., paths are I1-T1, I1-T2, I1-T3, I1-T4, I2-T1, I2-T2, I2-T3, I2-T4, I3-T1, I3-T2, I3-T3, I3-T4). Host 14a may communicate with the data storage system 102 over any of the 4 paths I3-T2, I3-T3, I3-T4 and host 14b may communicate with the data storage system 102 over any of the 8 paths I1-T1, I1-T2, I1-T3, I1-T4, I2-T1, I2-T2, I2-T3, I2-T4. For example, host 14a may communicate with system 102 over path I3-T1 formed by the starting point, port 13 of the HBA 112c, and the ending point, port T1 of the receiving data storage system 102. Each port of an HBA may be characterized as a connectivity point or end point providing connectivity to the data storage system from the host associated with the HBA. Similarly, each target port may also be characterized as a connectivity point or end point. As illustrated, different HBAs from the same or different hosts may also communicate with the data storage system through the same port of the data storage system.

As described herein, an embodiment may represent a path using two end points. For example, a first end point of a path may be the WWN (world wide name) or other identifier of a host's HBA port (e.g., initiator port of a host) and the second end point of the path may be the WWN or other identifier of a data storage system port (e.g., target port) receiving a request from the host. As known to those skilled in the art, a WWN is a unique number assigned by a recognized naming authority that identifies a connection or a set of connections to the network. A WWN may be assigned for the life of a connection (device). As known to those skilled in the art, various networking technologies that may be used in an embodiment make use of WWNs. In connection with the techniques described herein, other embodiments may use other ways in defining a path that may vary with the connectivity in each embodiment. Although not illustrated in FIG. 3, the management software (which is illustrated as being included in the data storage system 102) may also execute on the management system 16 of FIG. 1 which is used in connection with management of the data storage system in 102.

Although only a single data storage system is illustrated for purposes of simplicity in illustration, each of the hosts may have connections to more than one data storage system in the SAN. Additionally, each host may be connected to the data storage system 102 using other connections, including direct cabling, than as illustrated in FIG. 3.

Each host, through its one or more paths, may be allowed to access a specified set of one or more LUNs. In some embodiments, a storage group may be defined as a logically defined container or set of LUNs. In this example, a first storage group or container of LUNs (e.g., LUNs A, B C and D) may be defined as 104a and a second storage group or container of LUNs (e.g., LUNs E, F, G, and H) may be defined as 104b. Only a portion of all the storage included in 102 may be visible to each host as designated by the different storage groups. In one example, LUNs included in 104a may be visible to host 14a and a second different set of LUNs included in 104b may be visible to host 14b. Although in this example, the sets of LUNs 104a and 104b may be mutually exclusive, it should be noted that each set may also include one or more of the same LUNs in accordance with the particular access to be allowed to each of the hosts or servers. An embodiment may optionally provide support for storage groups in which case the storage group may be assigned a unique storage group identifier by which to refer collectively to all LUNs in the particular storage group. An embodiment may also not utilize storage groups in which case the individual LUNs may be referenced. It should also be noted that an embodiment may allow both the use of storage groups along with identifying particular LUNs when specifying accessible LUNs.

Host, or initiator-based, access to individual LUNs or particular defined sets of LUNs (e.g., storage groups) may be controlled using the access logic 106 and the access control table 107. Techniques that may be performed in an embodiment by the access logic 106 using information in the access control table 107 to control access to logical devices are described, for example, in U.S. Pat. No. 6,061,753, issued on May 9, 2000, entitled "Apparatus and Method of Accessing Target Devices Across a Bus Utilizing Initiator Identifiers", Ericson, which is incorporated by reference herein. The access logic component 106 performs processing for any incoming data access request to the data storage system 102. The access logic 106 may be characterized as hardware and/or software that performs a filtering operation of received data requests allowing access to defined sets of LUNs. The particular set of LUNs which are accessible or visible to each of the hosts or servers may be configurable. Also, the particular groupings or sets of LUNs included in each grouping may be configurable. Information regarding which sets of LUNs, such as 104a and 104b, are visible to which hosts may be stored in the access control table 107 in the data storage system 102. Additional details regarding an access control table 107 that may be used in an embodiment in accordance with techniques herein are described in more detail in following paragraphs and in connection with other figures.

Requests received by the data storage system 102 may be of a variety of different types. Such requests may include, for example, read and write requests from hosts for data included on devices of the data storage system. The access logic component 106 may allow a host access to a particular storage group (e.g., one or more LUNs) or one or more LUNs based on the path from which a request is received.

It should be noted that the topology of the SAN, or more generally, the network or connections between hosts and data storage systems, may be discovered or determined using any suitable technique. Additionally, an embodiment may also use any suitable technique in connection with connection with creating or defining storage groups or containers of LUNs. For example, an embodiment may use techniques described in U.S. Pat. No. 8,185,639, May 22, 2012, "Server Identification in Storage Networks", Krishnan et al., which is incorporated by reference herein, and U.S. Pat. No. 6,754,718, Jun. 22, 2004, Dobberpuhl, et al., entitled "Pushing Attribute information to Storage Devices for Network Topology Access", which is incorporated by reference herein.

In connection with techniques herein, a path may be identified using the WWN of the sending HBA port (e.g., initiator port) and the WWN of the receiving port (e.g., target port) of the data storage system 102. It should be noted that the foregoing WWNs are part of the communications protocol used in connection with the embodiment described herein. Other embodiments may use other identifiers to denote the particular initiator and/or target ports. In one embodiment, the data storage system may receive management requests to associate each host with a defined set of one or more LUNs thereby identifying which LUNs a host may access. In this example, the particular sets of LUNs or storage groups (e.g., 104a and 104b) may then be associated with the one or more entries in the access control table 107 corresponding to each host. The access logic 106 may then use the information in the access control table 107 to determine whether to perform a data request based on the particular path information of a received request. The access logic 106 may determine which requests coming over certain paths are allowed specified access to LUNs as defined in the access control table 107. Generally, if a request is received over a path to perform a data operation with respect to a LUN, the access logic 106 either allows or disallows the data operation depending on whether the access control table 107 indicates that access to the LUN is allowed on the particular path. It should be noted that the access logic 106 may also be referred to as access control software which included code executed in connection with determining whether or not to allow a data operation (e.g., directed to a particular LUN received on a path from a host).

Different techniques may be used in connection with configuring storage access control such as configuring access by particular hosts to one or more particular LUNs. Described in following paragraphs are techniques that may be used in connection with configuring storage access control. However, prior to describing the novel techniques, some aspects of existing systems which do not utilize techniques herein will be described. In existing systems not utilizing such techniques described in following paragraphs, a data storage administrator may configure storage access on an individual per-path basis. As illustrated in FIG. 3, hosts attached to storage systems may have multiple paths to the data storage system's target ports. In such existing systems not using techniques herein, the storage administrator may be required to configure storage access control such as for the hosts 14a, 14b on an individual path by path basis. Configuring access control at the path level of granularity may be error prone and tedious. For example, with reference to FIG. 3, the storage administrator may be required to explicitly identify each of the 12 individual paths (e.g., by explicitly identifying each initiator and target port pairing denoting a path) over which storage access to the particular hosts are allowed. Additionally, with such path level access control, any SAN connectivity changes resulting in path changes (e.g., for paths between the hosts and data storage system) may cause data unavailability situations. For example, a connectivity change to an existing path may be due to hardware (e.g., replace a broken or failed HBA with a new HBA). When such a hardware component is replaced, a new WWN may be associated with the new hardware component HBA port thereby causing a change to the path. For example, a failed HBA having a first initiator ID (e.g., first WWN) may be replaced with a new HBA having a second initiator ID (e.g., second WWN different from the first WWN) resulting in a change to the path. Prior to replacement, the path may be defined by the initiator-target pair of first initiator ID and target ID. After replacing the failed HBA with the new HBA, the path may now be defined by the initiator-target pair of second initiator ID and target ID. Without use of techniques herein, the storage system administrator must now configure access for the new path otherwise a host would not be able to access LUNs over the new path. In a similar manner, if a new or additional target port is added to the data storage system such as due to a new FA be added thereby resulting in the creation of new additional paths from an initiator port, the storage administrator must issue additional commands to allow access to particular LUNs over each of the individual new paths.

In connection with techniques herein, an embodiment may provide for storage administrators to configure storage access control at the initiator level of granularity rather than at the per path level of granularity. For example, reference is made to FIG. 3 where there are 12 paths in total between the hosts 14a and 14b and the data storage system 102. In existing systems not using techniques herein whereby such systems require path-level specification of access control, the storage administrator enters commands which explicitly identify individually each of the 4 paths over which host 14a is allowed access to particular LUNs and explicitly identify individually each of the 8 paths over which host 14b is allowed access to particular LUNs. In accordance with techniques herein, the storage administrator may alternatively specify access control to one or more particular LUNs on a per initiator basis as will now be illustrated with reference to FIG. 4.

Figure 4:
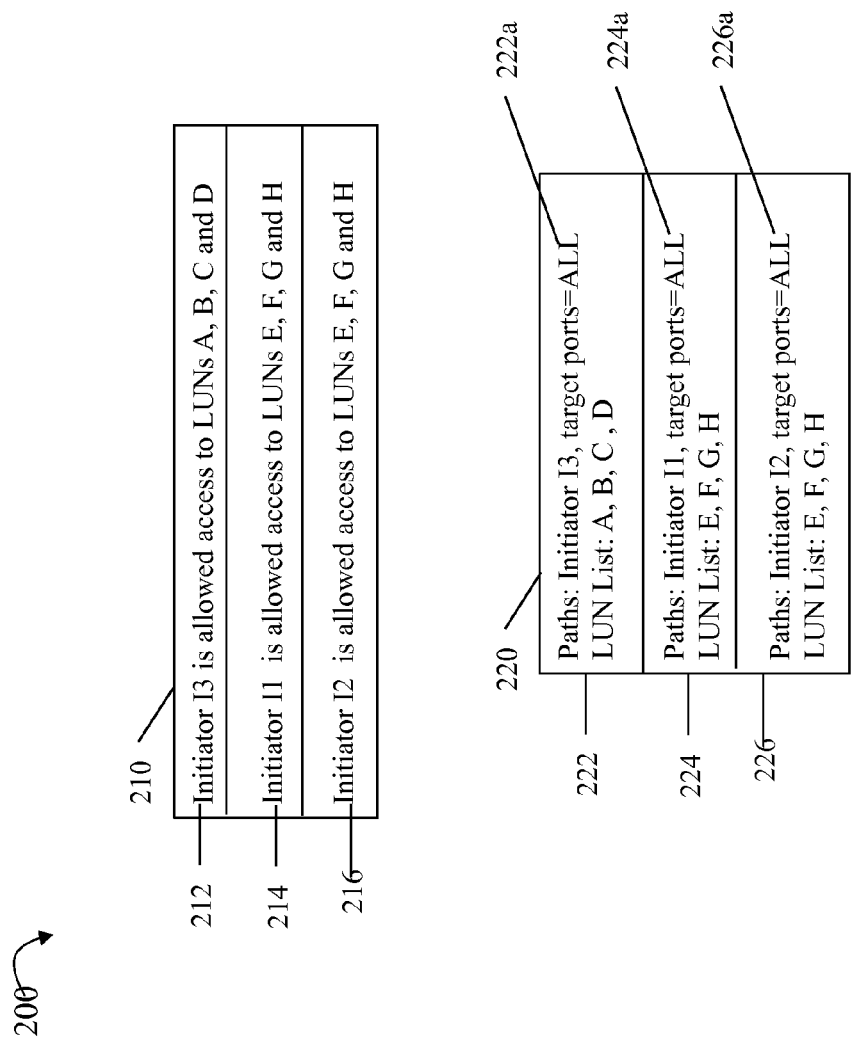
FIGS. 4, 6, 7 and 9 include exemplary commands that may be used in an embodiment in accordance with techniques herein.

Referring to FIG. 4, shown is an example illustrating exemplary management commands that may be utilized in an embodiment in connection with techniques herein to configure storage access control.

In connection with FIG. 4 and others herein, exemplary commands and associated syntax are provided. As will be appreciated by those skilled in the art, an embodiment may generally use any suitable syntax and command language.

The example 200 illustrates exemplary commands that may be utilized in configuring storage access control without using storage groups (SGs). Element 210 illustrates a first set of commands that may be issued to allow access at the initiator level of granularity. Element 212 illustrates a command that may be issued to allow initiator I3 of host 14a access to LUNs A, B, C and D. Element 214 illustrates a command that may be issued to allow initiator I1 of host 14b access to LUNs E, F, G and H. Element 216 illustrates a command that may be issued to allow initiator I2 of host 14b access to LUNs E, F, G and H. Thus, in connection with the first set of commands 210, the storage administrator does not have to explicitly identify each path over which access is allowed and may omit mention of any particular target port of the data storage system. With the commands of 210, the set of target ports used to configure the allowable paths over which the initiator ports are allowed to access identified LUNs are implied to be all target ports currently included in the data storage system. For example, with reference to FIG. 3, the set of target ports={T1, T2, T3 and T4} is used to configure the allowable paths when the commands of 210 are issued. With the command of 212 and the foregoing set of target ports, the allowable paths are determined as the set of paths formed between I3 and each target port (e.g., the 4 paths denoted as I3-T1, I3-T2, I3-T3, I3-T4). With the command of 214 and the foregoing set of target ports, the allowable paths are determined as the set of paths formed between I1 and each target port (e.g., the 4 paths denoted as I1-T1, I1-T2, I1-T3, I1-T4). With the command of 216 and the foregoing set of target ports, the allowable paths are determined as the set of paths formed between I2 and each target port (e.g., the 4 paths denoted as I2-T1, I2-T2, I2-T3, I2-T4).

Element 220 illustrates an alternative syntax that may be used to denote all target ports by including information in the command denoting "wildcarding" all target ports currently in the data storage system. Thus, commands 222, 224 and 226, respectively, denote alternative syntax for specifying commands 212, 214 and 216. In connection with both the commands of 210 and 220, the set of target ports (as used to determine allowable paths over which the specified LUNs are accessible) is determined as all target ports currently in the data storage system. Additionally, with respect to FIG. 3 representing the current state of the data storage system, commands 212 and 222 identify the same set of allowable paths I3-T1, I3-T2, I3-T3, I3-T4; commands 214 and 224 identify the same set of allowable paths I1-T1, I1-T2, I1-T3, I1-T4; and commands 216 and 226 identify the same set of allowable paths I2-T1, I2-T2, I2-T3, I2-T4. However, with the commands of 210, the set of target ports is determined implicitly or by default without explicitly including any input on the command line. With the commands of 220, the set of target ports may be determined through the explicit wildcarding syntax used (e.g., "target ports=ALL"). For example, with the command 222, the set of allowable paths is determined using the syntax "Paths: Initiator I3, target ports=ALL" (e.g., using the combination of identified initiator I3 with wildcard syntax of target ports ALL 222a denoting any and all target ports of the storage system). It should be noted that an embodiment may denote the wildcarding of ports using the keyword ALL or some other character (e.g. such as using "*") or keyword. The commands 224 and 226 identify sets of allowable paths using the wildcarding for target ports in a manner similar to that as described for 222.

Figure 5:
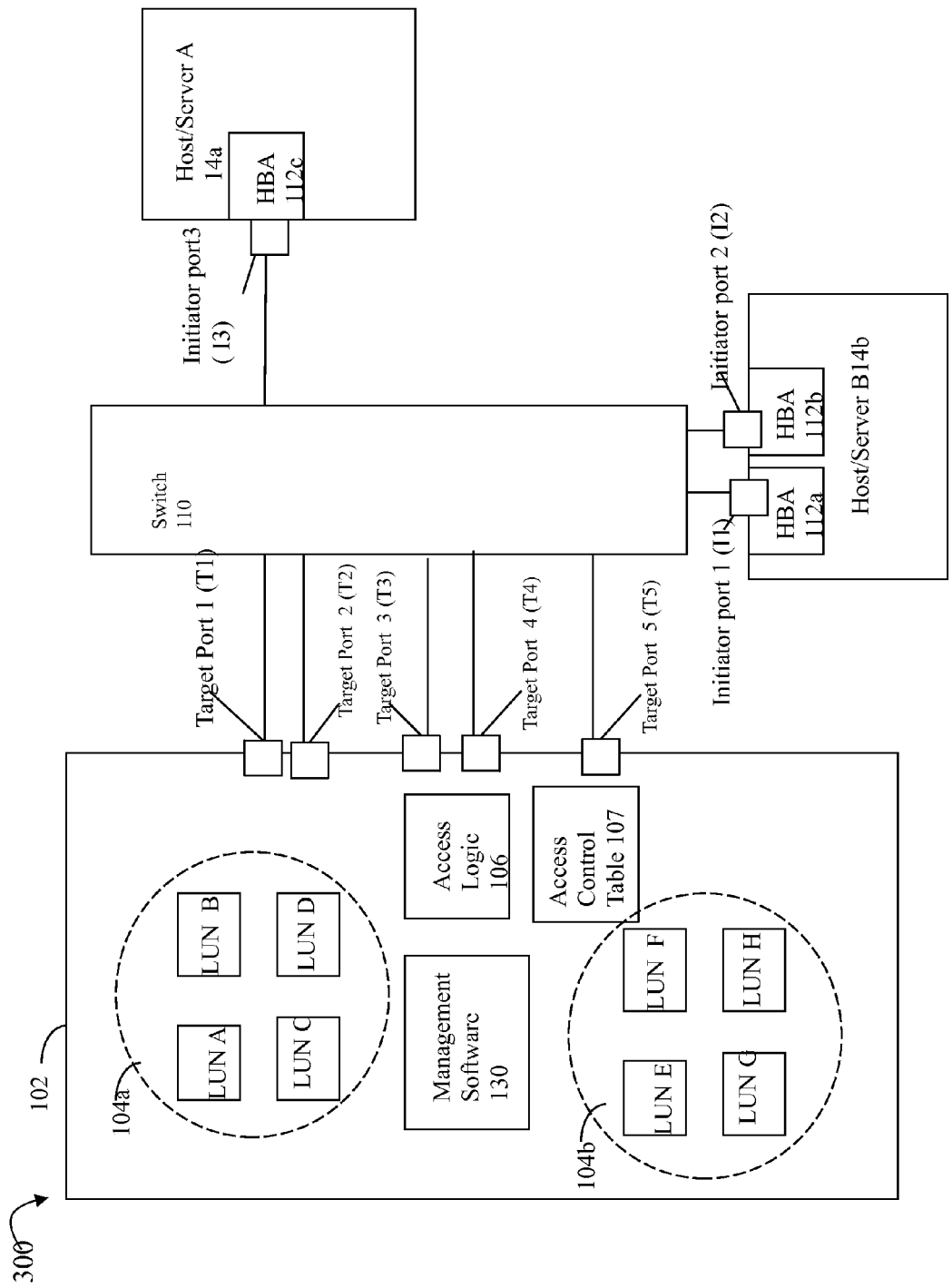

Additionally, in connection with the techniques herein using the implicit or explicit identification of all target ports currently in the data storage system, the set of target ports may change or be updated dynamically and automatically in response to any changes in the existing target ports of the data storage system. Thus, use of the techniques herein with initiator-level of granularity for storage access control provides for automatically adding and/or removing paths from an initiator's set of allowable paths for accessing specified LUNs as there may be changes to the target ports of the data storage system without requiring any additional commands. For example, assume that FIG. 3 illustrates a snapshot of the existing topology at a first point in time. At a second later point in time, assume that the data storage system 102 is modified to add another fifth target port T5 and that FIG. 5 represents the topology at this second point in time. FIG. 5 includes the elements of FIG. 3 along with the additional target port T5 of the data storage system 102. At this second point in time with the addition of T5, new paths now exist between each of initiators I1, I2 and I3 and T5 (e.g. paths I1-T5, I2-T5 and I3-T5). In connection with an embodiment not using techniques herein, new additional commands may be required to be issued for each of the new paths in order to allow the particular initiator ports to access the appropriate LUNs. For example, a first command may be issued to allow I3 to access LUNs A, B, C and D over the new path I3-T5, a second command may be issued to allow I1 to access LUNs E, F, G and H over the new path I1-T5, and a third command may be issued to allow I2 to access LUNs E, F, G, and H over the new path I2-T5. In contrast, in connection with techniques herein, no such additional commands are needed and access to the LUNs for the particular initiators over the new paths is automatically performed. With use of techniques herein, the set of target ports used to configure the allowable paths is automatically updated or adjusted since the set includes all target ports currently in the data storage system at each point in time. Thus, as the set of target ports of the data storage system may change over time, so does the allowable paths for each initiator without requiring any additional configuration commands to provide access for any path changes or additions. The foregoing is performed automatically, for example, as new target ports are added to the data storage system as just described. In a similar manner, as target ports are removed from the data storage system, the allowable paths for each initiator may be automatically updated to reflect the removal or deletion of any path including the removed target port(s). Thus, use of techniques herein with the automatic updating of the allowable paths for all initiators provides for resiliency in response to connectivity changes.

With reference back to FIG. 4, shown are exemplary commands that may be used whereby individual LUNs are specified. As described above, an embodiment may also provide support for storage groups or SGs whereby each SG denotes a logical grouping of one or more LUNs as illustrated in FIG. 6.

Figure 6:
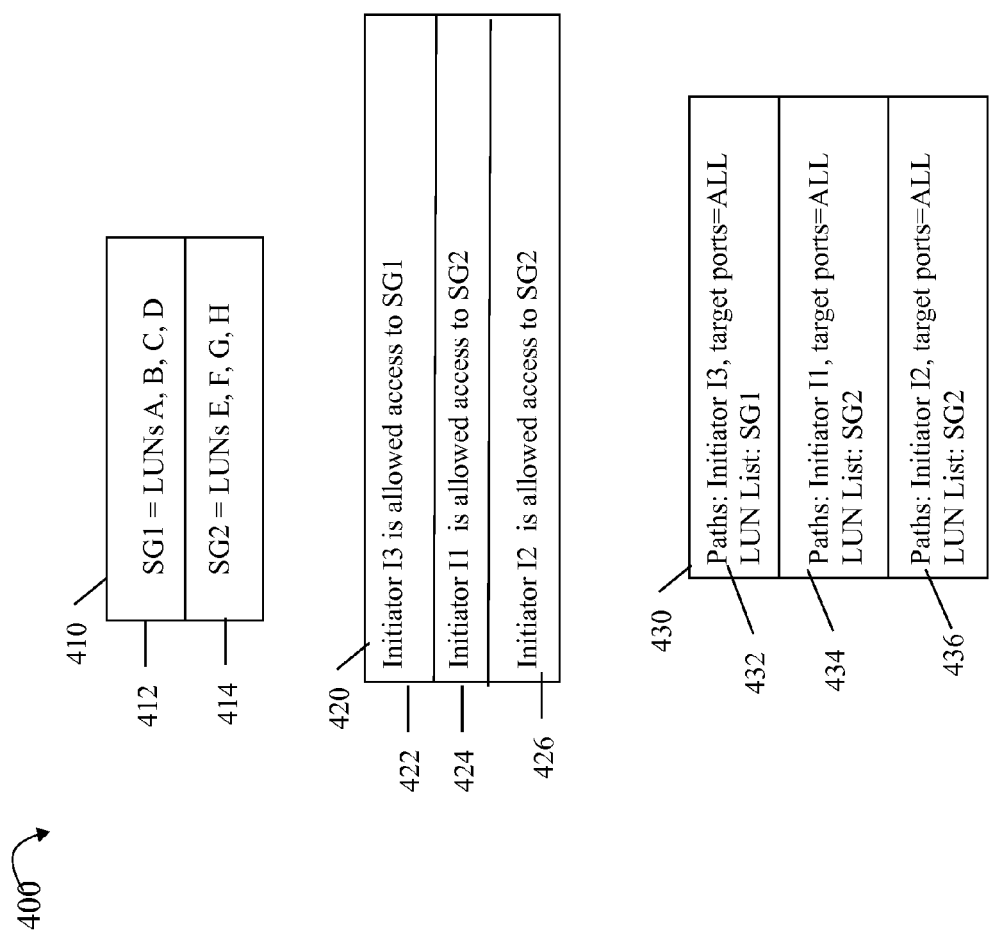

Referring to FIG. 6, shown is an example illustrating use of storage groups in connection with techniques herein. The example 400 includes element 410 which may represent a table of the existing SGs defined in an embodiment. Element 412 denotes a first defined storage group, SG1, that includes LUNs A, B, C and D. Element 414 denotes a second defined storage group, SG2, that includes LUNs E, F, G and H. Thus, with reference to FIGS. 3 and 4, SG1 412 represents the LUNs which are accessible to host 14a through I3 and SG2 414 represents the LUNs accessible to host 14b through each of I1 and I2. Elements 420 and 430, respectively, represent alternative ways in which commands of 210 and 220 of FIG. 4 may be expressed using SG rather than identifying individual LUNs. For example, commands 422, 424, 426, 432, 434 and 436, respectively, represent alternative ways in which commands 212, 214, 216, 222, 224, and 226 of FIG. 4 may be expressed using SGs.

In one aspect, the foregoing techniques provide for abstracting out or removing the per-path concept from the access control configuration commands. In this manner, access control may be specified with respect to identifying the initiators and have access apply to such initiators with respect to all paths and target ports. The foregoing techniques may also be characterized as providing a policy-based access control model whereby identified LUNs are accessible to particular initiator ports through all target ports of the data storage system. With reference for example, to FIGS. 4 and 6, the access control configuration command may denote an initiator and set of one or more LUNs (e.g., denoting that the initiator has access to the set of one or more LUNs) while wildcarding all target ports. In this manner, the initiator is automatically allowed access to the set of LUNs over all target ports even as modifications are made to the set of target ports of the data storage system (e.g., as the target port set of the data storage system may change over time). In this way, with initiator-level access control commands, an administrator does not need to specify or update access control to allow the initiator access over newly added paths (as target ports may be added) or over changes to an existing path (e.g., an existing target port may have its identity changed such as by changing the FA card and its ports/identifiers).

The foregoing techniques may be further generalized or extended to provide for one or more different levels of granularity in connection with specifying access control. For example, an embodiment may have a host-level of access control granularity as will now be described. With reference back to FIG. 3, there are two hosts 14a, 14b. In accordance with a host-based access control policy, commands may be provided in which any initiators of the identified host of the command may have access to the one or more LUNs of the command. The host-level access control policy may provide for "wildcarding" target ports and also "wildcarding" initiators of the identified host so that any new initiators of the identified host are automatically provided access over the same set of paths (through same target ports) as other existing initiators of the host. In other words, with host-level storage access control, both the set of initiators of the identified host and the set of target ports of the data storage system may be automatically and dynamically determined in a manner similar to that as described above with respect to the set of target ports for a single initiator. The allowable paths for a host at a point in time are determined with respect to all the host's initiator ports in existence at that point in time and all target ports of the data storage system at that point in time. As the initiator ports of the host and/or target ports of the data storage system may change over time, so does the set of allowable paths. Any new or different path resulting from changes to target ports currently in the data storage system and/or changes with respect to initiators of the host are automatically reflected in the set of allowable paths for a host.

Figure 7:
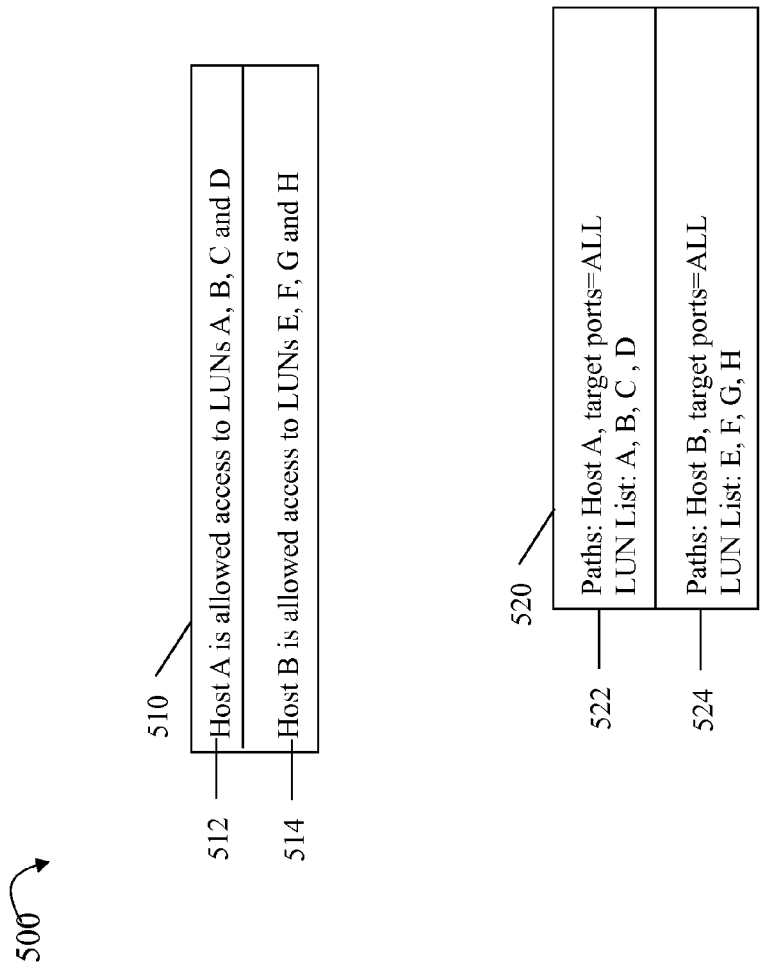

Referring to FIG. 7, shown is an example illustrating exemplary management commands that may be utilized in an embodiment in connection with techniques herein to configure storage access control. The example 500 illustrates exemplary commands that may be utilized in configuring storage access control without using storage groups (SGs). Element 510 illustrates a first set of commands that may be issued to allow access at the host level of granularity. With reference back to FIG. 3, Host A 14a includes I3 and Host B 14b includes I1 and I2. Element 512 illustrates a command that may be issued to allow host A 14a access to LUNs A, B, C and D. Element 514 illustrates a command that may be issued to allow host 14b access to LUNs E, F, G and H. Thus, in connection with the first set of commands 510, the storage administrator does not have to explicitly identify each path over which access is allowed and may omit mention of any particular target port of the data storage system. With the commands of 510, the set of target ports used to configure the allowable paths over which the initiator ports are allowed to access identified LUNs is implied to be all target ports currently included in the data storage system in a manner as described above. For example, with reference to FIG. 3, the set of target ports={T1, T2, T3 and T4} is used to configure the allowable paths when either of the commands of 510 are issued. Additionally, the set of initiator ports used to configure the allowable paths over which the identified LUNs are accessible is also implied to be all initiator ports of the identified host. For example, with the command of 512 and with reference to FIG. 3, the set of target ports={T1, T2, T3 and T4} and the set of initiator ports {I3} are used to configure the allowable paths when the command 512 is issued. With the command of 512 and the foregoing set of target ports and initiator ports for Host A 14*a*, the allowable paths are determined as the set of paths formed between I3 and each target port (e.g., the 4 paths denoted as I3-T1, I3-T2, I3-T3, I3-T4). The command 512 may be used in an embodiment providing host-level storage access control configuration rather than use command 212 of FIG. 4.

With the command of 514 and with reference to FIG. 3, the set of target ports={T1, T2, T3 and T4} and the set of initiator ports {I1, I2} are used to configure the allowable paths when the commands 514 is issued. With the command of 514 and the foregoing set of target ports and initiator ports for Host B, the allowable paths are determined as the set of paths formed between I1 and I2 and each target port (e.g., the 8 paths denoted as I1-T1, I1-T2, I1-T3, I1-T4, I2-T1, I2-T2, I2-T3, I2-T4). The command 514 may be used in an embodiment providing host-level storage access control configuration rather than use commands 214 and 216 of FIG. 4.

Element 520 illustrates an alternative syntax that may be used to denote all target ports by including information in the command denoting "wildcarding" all target ports of the data storage system explicitly and wildcarding implicitly all initiators of the identified host. Thus, commands 522 and 524 respectively, denote alternative syntax for specifying commands 512 and 514. In connection with both the commands of 510 and 520, the set of target ports (as used to determine allowable paths over which the specified LUNs are accessible) is determined as all target ports currently in the data storage system and all initiators of the identified hosts. Additionally, with respect to FIG. 3 representing the current state of the data storage system, commands 512 and 522 identify the same set of allowable paths I3-T1, I3-T2, I3-T3, I3-T4; and commands 514 and 524 identify the same set of allowable paths I1-T1, I1-T2, I1-T3, I1-T4, I2-T1, I2-T2, I2-T3, I2-T4. However, with the commands of 510, the set of target ports and initiators may be determined implicitly or by default without explicitly including any inputs denoting a target port or initiator on the command line.

Figure 8:
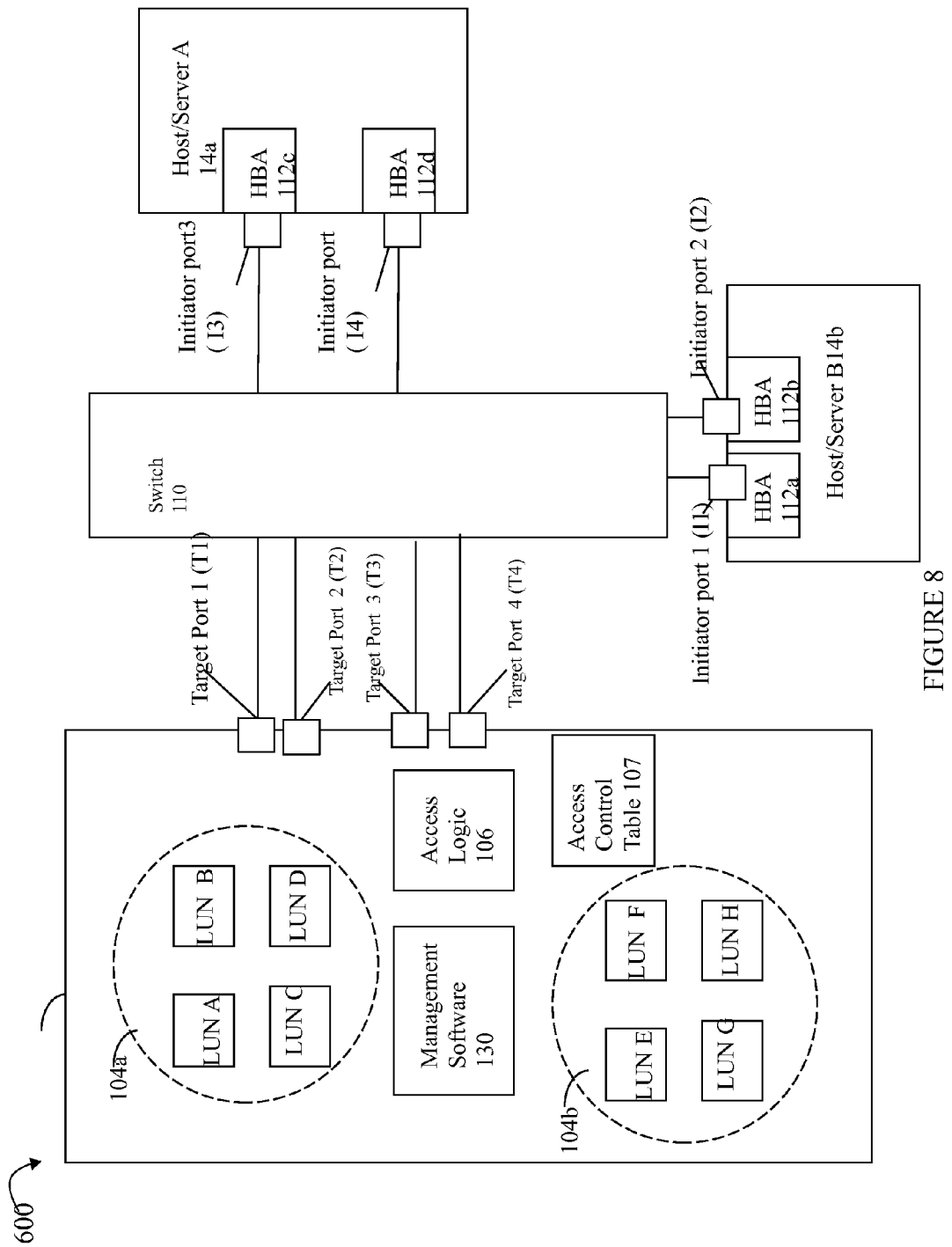

Additionally, in connection with the techniques herein using the implicit or explicit identification of all target ports currently in the data storage system, the set of target ports may change or be updated dynamically and automatically in response to any changes in the existing target ports of the data storage system. Similarly, with the use of host-level storage access control to identify a host thereby identifying the set of initiators as all initiators of the particular host, the set of initiator ports used to determine allowable paths may change or be updated dynamically and automatically in response to any changes in the existing initiators of the identified host. Thus, use of the techniques herein with host-level of granularity for storage access control provides for automatically adding and/or removing paths from a host's set of allowable paths for accessing specified LUNs as there may be changes to the target ports of the data storage system and/or changes to the initiator ports of the host without requiring any additional commands. For example, assume that FIG. 3 illustrates a snapshot of the existing topology at a first point in time. At a second later point in time, assume that the host 14*a* is modified to add another initiator port I5 and that FIG. 8 represents the topology at this second point in time. FIG. 8 includes the elements of FIG. 3 along with the additional initiator port I5 of host 14*a*. At this second point in time with the addition of I4, new paths now exist between I4 and each of the target ports T1, T2, T3 and T4 (e.g. paths I4-T1, I4-T2 I4-T3, I4-T4). In connection with an embodiment not using techniques herein, new additional commands may be required to be issued for each of the new paths in order to allow the particular initiator ports to access the appropriate LUNs. In connection with techniques herein, the set of initiator ports for host 14*a* (host A) used to configure the allowable paths is automatically updated or adjusted since the set includes all initiator ports currently in the host at each point in time. Thus, as the set of initiator ports of the host and/or set of target ports may change over time, so does the allowable paths for each host. The foregoing is performed automatically, for example, as new target ports are added to the data storage system and/or as new initiators are added to the identified host. In a similar manner, as target ports are removed from the data storage system and/or initiators are removed from an identified host, the allowable paths for each host may be automatically updated to reflect the removal or deletion of any path including the removed target port(s) and/or removed initiator(s) of the host. Thus, use of techniques herein with the automatic updating of the allowable paths with respect to an identified host provides for resiliency in response to connectivity changes.

With reference back to FIG. 7, shown are exemplary commands that may be used whereby individual LUNs are specified. As described above and illustrated in connection with FIG. 6, SGs may be used in connection with the commands of FIG. 7 rather than identifying individual LUNs.

The foregoing techniques may be further generalized or extended to provide for host cluster or host-group level of access control granularity as will now be described. With reference back to FIG. 3, there are two hosts 14*a*, 14*b*. In accordance with a host-cluster or host-group based access control policy, a logical group or cluster of hosts may be defined to include hosts 14*a* and 14*b*. In connection with techniques herein, commands may be provided in which any initiators of the hosts of the host-group identified in the command may have access to the one or more LUNs of the command. The host-group level access control policy may provide for "wildcarding" target ports, "wildcarding" hosts of the host-group, and also "wildcarding" initiators of the identified set of hosts so that any new initiators of the identified host group are automatically provided access over the same set of paths (through same target ports) as other existing initiators of the host. In other words, with host-group level storage access control, the set of initiators of the identified hosts and the set of target ports of the data storage system may be automatically and dynamically determined in a manner similar to that as described above. The allowable paths for a host-group at a point in time are determined with respect to all initiator ports of all hosts in the group at that point in time and all target ports of the data storage system at that point in time. As the particular hosts in the group, the initiator ports of the hosts of the group, and/or target ports of the data storage system may change over time, so does the set of allowable paths. Any new or different path resulting from changes to target ports currently in the data storage system and/or changes with respect to initiators as determined by the hosts in the group are automatically reflected in the set of allowable paths for the host-group.

Figure 9:
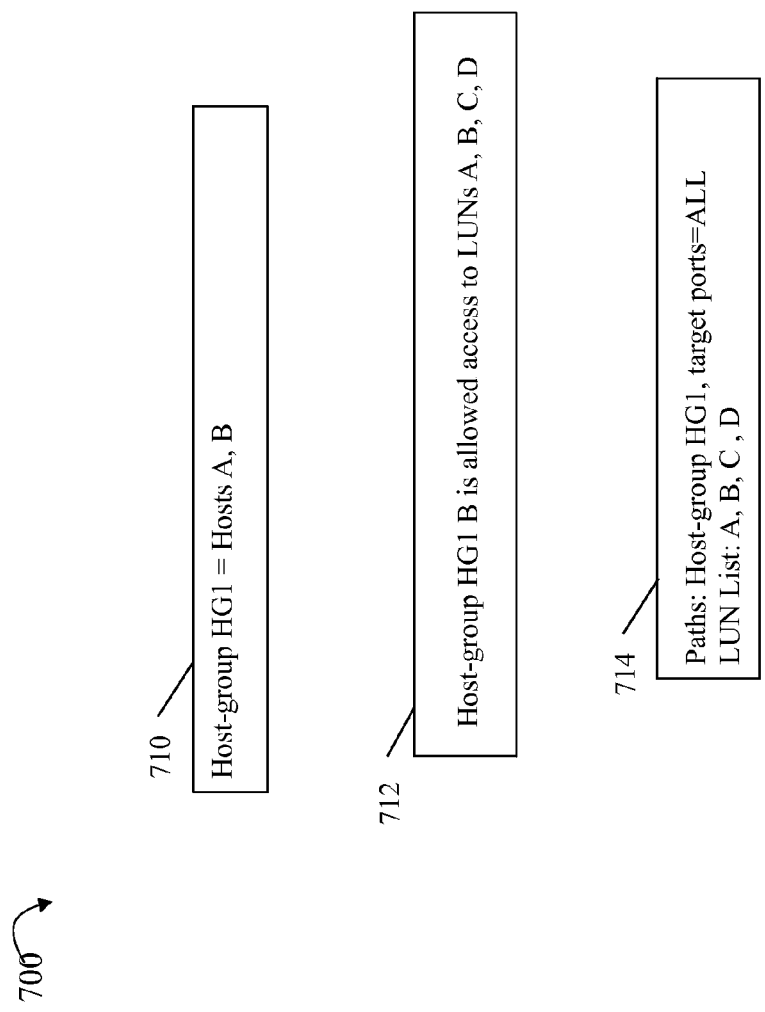

Referring to FIG. 9, shown is an example illustrating exemplary management commands that may be utilized in an embodiment in connection with techniques herein to configure storage access control with host-group level access control. The example 700 illustrates exemplary commands that may be utilized in configuring storage access control without using SGs. It should be noted that commands of 700 may be modified to use SGs in a manner similar to that as described elsewhere herein.

Element 710 may represent the defined host-groups. A host-group may be a logical entity defined using a management command to identify one or more hosts in the named group. In this manner, a named host-group (HG) may be referenced in a command to provide access to one or more LUNs to each host in the named group. Element 710 illustrates a single named host-group HG1 defined to include hosts A and B (e.g., hosts 14a, 14b as in FIG. 3 and others). Element 712 illustrates a command that may be issued to allow access at the host-group level of granularity. Element 712 illustrates a command that may be issued to allow hosts A and B (14a and 14b) access to LUNs A, B, C and D. Thus, in connection with the command 712, the storage administrator does not have to explicitly identify each path over which access is allowed for the hosts in the host-group and may omit mention of any particular host, initiator or target port of the data storage system. With the command 712, the set of target ports used to configure the allowable paths over which the initiator ports are allowed to access identified LUNs are implied to be all target ports currently included in the data storage system in a manner as described above. For example, with reference to FIG. 3, the set of target ports={T1, T2, T3 and T4} is used to configure the allowable paths when the command 712 is issued. Additionally, the set of initiator ports used to configure the allowable paths over which the identified LUNs are accessible is also implied to be all initiator ports of the identified hosts in HG1. For example, with the command of 512 and with reference to FIG. 3, the set of target ports={T1, T2, T3 and T4} and the set of initiator ports {I1, I2 and I3} are used to configure the allowable paths when the command 712 is issued. With the command of 512 and the foregoing set of target ports and initiator ports for Hosts A and B, the allowable paths are determined as the set of paths formed between I1, I2 and I3 and each target port (e.g., the 12 paths denoted as I1-T1, I1-T2, I1-T3, I1-T4, I2-T1, I2-T2, I2-T3, I2-T4, I3-T1, I3-T2, I3-T3, I3-T4). The command 712 may be used in an embodiment providing host-group level storage access control configuration rather than, for example, use commands providing host-level or initiator-level storage access control as described elsewhere herein.

Element 714 illustrates an alternative syntax that may be used to denote all target ports by including information in the command denoting "wildcarding" all target ports of the data storage system explicitly and wildcarding implicitly all initiators of the identified host-group. Thus, command 712 denotes alternative syntax for specifying commands 714. In connection with both the commands 712 and 714, the set of target ports (as used to determine allowable paths over which the specified LUNs are accessible) is determined as all target ports currently in the data storage system and all initiators of the identified hosts in the host-group. Additionally, with respect to FIG. 3 representing the current state of the data storage system, commands 712 and 714 identify the same set of allowable paths. However, with the command 712, the target ports, initiators and hosts used in specifying the allowable paths (paths over which the identified LUNs are accessible) may be determined implicitly (e.g., the target ports are implicitly determined to include all those of the data storage system, the initiator ports are implicitly determined to include all initiator ports of all hosts of the identified HG).

Additionally, in connection with the techniques herein using the implicit or explicit identification of all target ports currently in the data storage system, the set of target ports may change or be updated dynamically and automatically in response to any changes in the existing target ports of the data storage system when using the commands of FIG. 9 for host-group level access control. Similarly, with the use of host-group level storage access control to identify a host-group thereby identifying the set of initiators as all initiators of the particular hosts of the host-group, the set of initiator ports used to determine allowable paths may change or be updated dynamically and automatically in response to any changes in the existing initiators of the identified host-group (e.g., by adding or removing hosts from the host-group, or by adding or removing initiators from existing hosts of the host-group without adding or removing any single host). Thus, use of the techniques herein with host-group level of granularity for storage access control provides for automatically adding and/or removing paths from a host-group's set of allowable paths for accessing specified LUNs as there may be changes to the target ports of the data storage system and/or changes to the initiator ports of the hosts in the host-group without requiring any additional commands. For example, assume that FIG. 3 illustrates a snapshot of the existing topology at a first point in time. At a second later point in time, assume that the host 14a is modified to add another initiator port I5 and that FIG. 8 represents the topology at this second point in time. FIG. 8 includes the elements of FIG. 3 along with the additional initiator port I5 of host 14a. At this second point in time with the addition of I4, new paths now exist between I4 and each of the target ports T1, T2, T3 and T4 (e.g. paths I4-T1, I4-T2 I4-T3, I4-T4). In connection with techniques herein, the set of initiator ports for host-group HG1 used to configure the allowable paths for HG1 is automatically updated or adjusted since the set includes all initiator ports of all hosts currently in the host-group HG1 at each point in time. Thus, as any one or more of the following may change over time: the hosts included in HG1, set of initiator ports of the hosts of HG1 and/or set of target ports, so does the allowable paths for the host-group HG1. The foregoing is performed automatically, for example, as new target ports are added to the data storage system and/or as new initiators are added to the identified host-group (e.g., either by adding a new host with initiators to HG1 or adding initiators to an existing host of HG1). In a similar manner, as target ports are removed from the data storage system and/or initiators are removed from the host-group, the allowable paths for the host-group may be automatically updated to reflect the removal or deletion of any path including the removed target port(s) and/or removed initiator(s). Thus, use of techniques herein with the automatic updating of the allowable paths with respect to an identified host-group provides for resiliency in response to connectivity changes.

It should be noted that the access control table 107 such as included in FIGS. 3, 5 and 8 may include information regarding allowable paths and associated LUNs accessible over those paths in any suitable form.

Figure 10:
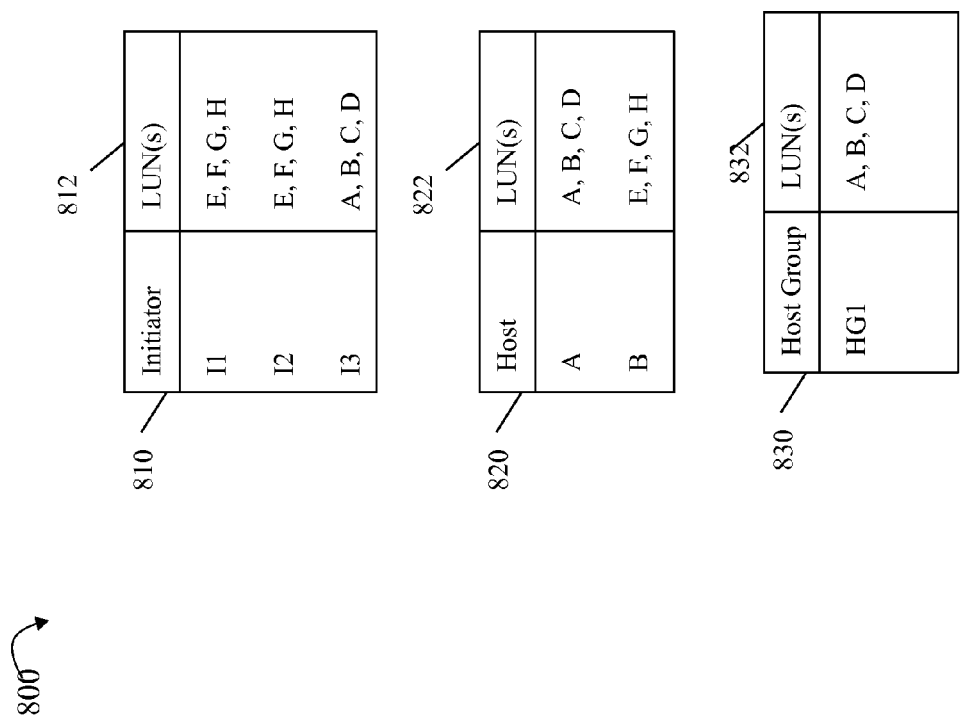
FIG. 10 illustrates information that may be included in an access control table in an embodiment in accordance with techniques herein.

For example, with reference to FIG. 10, in an embodiment providing initiator-level storage access control as in FIG. 4, element 810 may represent information stored in the access control table 107. The table 810 may denote pairings of an initiator and one or more LUNs to which the initiator is provided access over all paths to the initiator. Each row in the table 810 identifies one such pairing. In an embodiment in which SGs are used rather than identifying particular LUNs, the SG may be identified in column 812 rather than the particular LUN.

In an embodiment providing host-level storage access control as in FIG. 7, element 820 may represent information stored in the access control table 107. The table 820 may denote pairings of a host and one or more LUNs to which the host is provided access over all paths to all initiators of the host. Each row in the table 820 identifies one such pairing. In an embodiment in which SGs are used rather than identifying particular LUNs, the SG may be identified in column 822 rather than the particular LUN.

In an embodiment providing host-group level storage access control as in FIG. 9, element 830 may represent information stored in the access control table 107. The table 830 may denote pairings of a host-group and one or more LUNs to which the host-group is provided access over all paths to all initiators of all the hosts in the host-group. Each row in the table 830 identifies one such pairing. In an embodiment in which SGs are used rather than identifying particular LUNs, the SG may be identified in column 832 rather than the particular LUN.

In connection with the foregoing, described generally is a nested level of logical entities on the initiator or request sending side whereby the nesting of logical entities includes initiators, hosts including initiators, and host-groups (including hosts which include initiators). More generally, techniques herein may be used in connection with providing storage access control with any number of nesting levels and an embodiment may provide support for access control at any one or more of the different levels. To further illustrate, an embodiment may include support for any one or more of the initiator-level, host-level and/or host-group level of access control. Additionally, an embodiment may further define another logical entity X which may include multiple host-groups and allow storage access control to be specified at this additional logical entity level in accordance with techniques herein (e.g., identifying logical entity X in storage access control commands to denote access to one or more LUNs from all target ports to all initiators within the logical entity X).

In connection with techniques herein, there is no need to reconfigure or grant new or modified access to LUNs as the set of allowable paths may change. However paths change based on target ports, the associated access granted also automatically changes to cover existing target ports. Additionally, the automatic adjustment or modification of allowable paths may vary with the particular level of granularity of access control. With an initiator-level access policy, an initiator is allowed to access a set of LUNs on all paths thereby wildcarding target ports (e.g., include all target ports and accordingly adjusting the set of target ports and associated allowable paths automatically as target ports may change on the data storage system). With a host-level access policy, a host is allowed to access a set of LUNs on all paths thereby wildcarding target ports (e.g., include all target ports and accordingly adjusting the set of target ports and associated allowable paths automatically as target ports may change on the data storage system) and also wildcarding initiators of the identified host (e.g., include all initiator ports of the host and accordingly adjusting the set of initiator ports and associated allowable paths automatically as initiators of the host may change). With a host-group or host-cluster level access policy, each host in a logical grouping of one or more hosts is allowed to access a set of LUNs on all paths thereby wildcarding target ports (e.g., include all target ports and accordingly adjusting the set of target ports and associated allowable paths automatically as target ports may change on the data storage system), wildcarding hosts within the group (e.g., accordingly adjusting the set of hosts and associated allowable paths automatically as host included in the group may change over time) and wildcarding initiators of the identified hosts in the group (e.g., include all initiator ports of all hosts and accordingly adjusting the set of initiator ports and associated allowable paths automatically as initiators of the hosts may change such as due to adding a new host with additional initiators or by adding an initiator to an existing host of the group).

Figure 11:
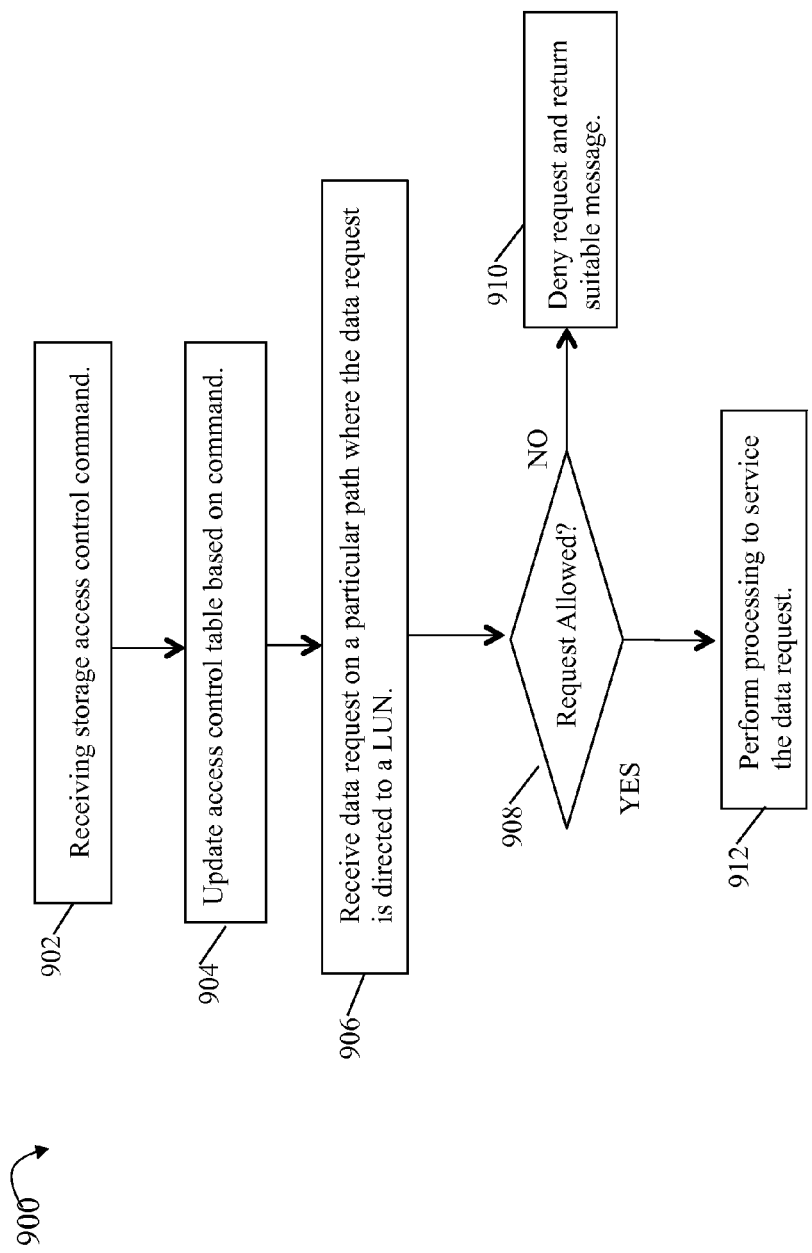
FIG. 11 is a flowchart of processing steps that may be performed in an embodiment in accordance with techniques herein.

Referring to FIG. 11, shown is a flowchart of processing steps that may be performed in an embodiment in accordance with techniques herein. At step 902, a storage access control command may be received. Such commands may be as described above and illustrated in FIGS. 4, 6, 7, and 9. At step 904, the access control table may be updated based on the received command. Examples of the access control table are described in connection with FIG. 10. At some later point in time in step 906, a data request is received at the data storage system. The data request may be received from a host on a particular path and may be directed to a particular LUN. For example, the data request may be a request by a host to read or write data to a LUN having storage provisioned on the data storage system. At step 908, a determination is made as to whether to allow the data request. Step 908 may use information included in the access control table to determine whether or not to allow the request. If step 908 evaluates to no, control proceeds to step 910 to deny the request and return a suitable message. If step 908 evaluates to yes, control proceeds to step 912 to perform processing to service the data request. Although not illustrated in the flow control of FIG. 11, steps 902 and 904 may be performed in an ongoing manner as access control commands are received over time. Additionally, steps 906, 908, 910 and 912 may be repeated in an ongoing manner responsive to data requests received at the data storage system.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable storage medium (also referred to as a computer readable medium) having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for configuring storage access control comprising:
    receiving a set of inputs including a first identifier of an initiator port and a device set of one or more devices in a data storage system; and
    responsive to said receiving, automatically defining an allowable path set for the initiator port in accordance with an initiator-level of granularity, wherein each device in the device set is accessible by the initiator port over each path in the allowable path set, wherein the allowable path set includes paths between the initiator port and each target port of the data storage system and wherein a set of one or more target ports used to define the allowable path set is either specified by including in the set of inputs a wildcard indicator denoting all target ports of the data storage system thereby indicating that the allowable path set is defined with respect to paths between the initiator port and all target ports of the data storage system, or the set of one or more target ports is otherwise determined implicitly as all target ports of the data storage system and the set of inputs does not include any input denoting the set of target ports.

2. The method of claim 1, wherein the allowable path set is defined by providing the first identifier of the initiator port and the device set in said set of inputs using storage access control software and without explicitly identifying any target port as an input in the set of inputs, and wherein said automatically defining an allowable path set for the initiator port is performed by executing code of the access control software.

3. The method of claim 1, wherein the allowable path set is defined by implicitly using all target ports currently in the data storage system.

4. The method of claim 3, wherein the allowable path set is automatically updated in accordance with any changes to existing target ports of the data storage system.

5. The method of claim 4, wherein the data storage system does not include a first target port at a first point in time and the data storage system does include the first target port at a second point in time subsequent to the first point in time, and wherein the allowable path set at the first point in time does not include a first path from the initiator port to the first target port, and wherein, responsive to adding the first target port to the data storage system at the second point in time, the allowable path set is automatically updated to include a new path that is the first path from the initiator port to the first target port thereby automatically allowing the initiator port access to each device in the device set over the first path.

6. The method of claim 4, wherein the data storage system includes a first target port at a first point in time and the data storage system does not include the first target port at a second point in time subsequent to the first point in time, and wherein the allowable path set at the first point in time does include a first path from the initiator port to the first target port, and wherein, responsive to removing the first target port from the data storage system at the second point in time, the allowable path set is automatically updated to remove the first path from the initiator port to the first target port.

7. The method of claim 1, wherein the allowable path set for the initiator port is defined by providing the set of inputs to storage access control software, the set of inputs including the first identifier of the initiator port, the device set, and the wildcard indicator denoting all target ports of the data storage system thereby indicating that the allowable path set is defined with respect to paths between the initiator port and all target ports of the data storage system.

8. A method for configuring storage access control comprising:
receiving a set of inputs including a device set of one or more devices in a data storage system and a first identifier identifying an entity that is any of an initiator port, a host, a group of one or more hosts; and
responsive to said receiving, automatically defining an allowable path set for the entity in accordance with an entity-level of granularity, wherein a set of one or more target ports used to define the allowable path set is either specified by including in the set of inputs a wildcard indicator denoting all target ports of the data storage system thereby indicating that the allowable path set is defined with respect to all target ports of the data storage system, or the set of one or more target ports is otherwise determined implicitly as all target ports of the data storage system and the set of inputs does not include any input denoting the set of target ports; and
wherein if the first identifier identifies the initiator port, each device in the device set is accessible by the initiator port over each path in the allowable path set and the allowable path set includes paths between the initiator port and each target port of the data storage system; and
wherein if the first identifier identifies the host, the allowable path set includes paths between each initiator port of the host and each target port of the data storage system and each device in the device set is accessible to the host over each path in the allowable path set; and
wherein if the first identifier identifies the group of one or more hosts, the allowable path set includes paths between each initiator port of each host in the group and each target port of the data storage system and each device in the device set is accessible to each host in the group over each path in the allowable path set from an initiator port of said each host.

9. The method of claim 8, wherein the first identifier identifies the host, and at a first point in time, a first initiator set of one or more initiator ports identifies all initiator ports of the host at the first point in time and a first target port set of one or more ports identifies all target ports of the data storage system at the first point in time, and at a second point in time subsequent to the first point in time, a second initiator set of one or more initiator ports identifies all initiator ports of the host at the second point in time and a second target port set of one or more ports identifies all target ports of the data storage system at the second point in time, and
wherein the allowable path set is automatically updated at the second point time responsive to any differences between the first initiator set and the second initiator set and responsive to any differences between the first target port set and the second target port set.

10. The method of claim 9, wherein the second initiator set includes a first initiator port not included in the first initiator set and the allowable path set from the first point in time is automatically updated at said second point in time to add a new path for each path between the first initiator port and each target port of the second target port set.

11. The method of claim 9, wherein the first initiator set includes a first initiator port not included in the second initiator set and the allowable path set from the first point in time is automatically updated at said second point in time to remove any path including the first initiator port.

12. The method of claim 9, wherein the first identifier identifies the group of one or more hosts, and at a first point in time, a first initiator set of one or more initiator ports identifies all initiator ports of all the hosts in the group at the first point in time, and a first target port set of one or more ports identifies all target ports of the data storage system at the first point in time, and at a second point in time subsequent to the first point in time, a second initiator set of one or more initiator ports identifies all initiator ports of all the hosts in the group at the second point in time, and a second target port set of one or more ports identifies all target ports of the data storage system at the second point in time, and
wherein the allowable path set is automatically updated at the second point time responsive to any differences between the first initiator set and the second initiator set, and responsive to any differences between the first target port set and the second target port set.

13. The method of claim 12, wherein the second initiator set includes a first initiator port not included in the first initiator set and the allowable path set from the first point in time is automatically updated at said second point in time to add a new path for each path between the first initiator port and each target port of the second target port set.

14. The method of claim 13, wherein the first initiator port is included in a first host and the first host is included in group at the second point in time and the first host is not included in the group at the first point in time.

15. The method of claim 12, wherein the first initiator set includes a first initiator port not included in the second initiator set and the allowable path set from the first point in time is automatically updated at said second point in time to remove any path including the first initiator port.

16. The method of claim 8, wherein if the first identifier identifies the host, the allowable path set is defined by implicitly using all initiator ports currently in the host, and wherein if the first identifier identifies the group of one or more hosts, the allowable path set is defined by implicitly using all initiator ports currently in all hosts of the group.

17. A non-transitory computer readable medium comprising code stored thereon for configuring storage access control, the non-transitory computer readable medium comprising code that, when executed, performs a method comprising:
  receiving a set of inputs including a first identifier of an initiator port and a device set of one or more devices in a data storage system; and
  responsive to said receiving, automatically defining an allowable path set for the initiator port in accordance with an initiator-level of granularity, wherein each device in the device set is accessible by the initiator port over each path in the allowable path set, wherein the allowable path set includes paths between the initiator port and each target port of the data storage system and wherein a set of one or more target ports used to define the allowable path set is either specified by including in the set of inputs a wildcard indicator denoting all target ports of the data storage system thereby indicating that the allowable path set is defined with respect to paths between the initiator port and all target ports of the data storage system, or the set of one or more target ports is otherwise determined implicitly as all target ports of the data storage system and the set of inputs does not include any input denoting the set of target ports.

18. The non-transitory computer readable medium of claim 17, wherein the allowable path set is defined by providing the first identifier of the initiator port and the device set in said set of inputs using storage access control software and without explicitly identifying any target port as an input in the set of inputs, and wherein said automatically defining an allowable path set for the initiator port is performed by executing code of the access control software.

19. The non-transitory computer readable medium of claim 17, wherein the allowable path set is defined by implicitly using all target ports currently in the data storage system.

20. The non-transitory computer readable medium of claim 17, wherein the allowable path set is automatically updated in accordance with any changes to existing target ports of the data storage system.

* * * * *